(12) United States Patent
Griffin et al.

(10) Patent No.: US 9,911,176 B2
(45) Date of Patent: Mar. 6, 2018

(54) SYSTEM AND METHOD OF PROCESSING IMAGES INTO SUB-IMAGE PORTIONS FOR OUTPUT TO A PLURALITY OF DISPLAYS SUCH AS A NETWORK VIDEO WALL

(71) Applicants: Timothy E Griffin, Calgary (CA); Adam R McDaniel, Calgary (CA); Reza Razavi, Calgary (CA); Stirling Westrup, Montreal (CA)

(72) Inventors: Timothy E Griffin, Calgary (CA); Adam R McDaniel, Calgary (CA); Reza Razavi, Calgary (CA); Stirling Westrup, Montreal (CA)

(73) Assignee: Userful Corporation, Calgary (CA)

( * ) Notice: Subject to any disclaimer, the term of this patent is extended or adjusted under 35 U.S.C. 154(b) by 0 days.

(21) Appl. No.: 14/594,590

(22) Filed: Jan. 12, 2015

(65) Prior Publication Data
US 2016/0203579 A1 Jul. 14, 2016

(51) Int. Cl.
*G06F 3/14* (2006.01)
*G06T 1/60* (2006.01)
(Continued)

(52) U.S. Cl.
CPC ............. *G06T 1/60* (2013.01); *G06F 3/1438* (2013.01); *G06F 3/1446* (2013.01); *G09G 5/006* (2013.01); *G09G 5/12* (2013.01); *G09G 2320/0693* (2013.01); *G09G 2340/14* (2013.01); *G09G 2370/022* (2013.01); *G09G 2370/042* (2013.01);
(Continued)

(58) Field of Classification Search
None
See application file for complete search history.

(56) References Cited

U.S. PATENT DOCUMENTS 6,115,022 A * 9/2000 Mayer, III ............... H04N 9/12
345/418
7,158,140 B1 * 1/2007 Klebanov ............. G06F 3/1438
345/502
(Continued)

FOREIGN PATENT DOCUMENTS

CN 102036043 4/2011
DE 112006003371 12/2013

*Primary Examiner* — Yingchun He

(57) ABSTRACT

A system is disclosed for improving the flexibility and performance of video walls including a method for using a primary GPU for initial rendering to a GPU frame buffer, copying of this frame buffer to system memory for processing into multiple sub-frames then outputting the sub-frames via multiple secondary graphics controllers. This system enables the video wall server to leverage performance advantages afforded by GPU acceleration and maintaining performance while providing full flexibility of the CPU and system memory to apply the required transformations to the sub-images as well as flexibility in the selection of secondary graphics controllers (including network graphics approaches where the graphics controller is connected over a network) for outputting the multiple sub-images to a plurality of displays. This has applications generally in the field of real-time multiple display graphics processing as well as specific applications in the field of video walls and network video walls. A method and computer readable medium are also disclosed that operate in accordance with the system.

20 Claims, 4 Drawing Sheets

(51) Int. Cl.
 *G09G 5/00* (2006.01)
 *G09G 5/12* (2006.01)
(52) U.S. Cl.
 CPC ..... *G09G 2370/06* (2013.01); *G09G 2370/16* (2013.01)

(56) References Cited

U.S. PATENT DOCUMENTS

| | | | |
|---|---|---|---|
| 7,184,041 B2* | 2/2007 | Heng | G06T 15/04 345/424 |
| 7,796,129 B2 | 10/2010 | Bakalash | |
| 8,395,631 B1* | 3/2013 | Wilt | G06F 9/5016 345/502 |
| 8,407,347 B2 | 3/2013 | Zang | |
| 8,911,291 B2 | 12/2014 | Liu | |
| 2008/0246781 A1* | 10/2008 | Surati | H04N 5/74 345/690 |
| 2009/0322784 A1 | 12/2009 | Sartori | |
| 2011/0267328 A1* | 11/2011 | Venkatasubramanian | G06F 3/1431 345/211 |
| 2014/0146080 A1 | 5/2014 | Ivashin | |
| 2014/0152706 A1* | 6/2014 | Park | G09G 3/2003 345/690 |
| 2014/0184601 A1 | 6/2014 | Dunaisky | |
| 2014/0184614 A1 | 6/2014 | Lung | |
| 2015/0279037 A1* | 10/2015 | Griffin | G06T 7/0024 345/1.3 |

* cited by examiner

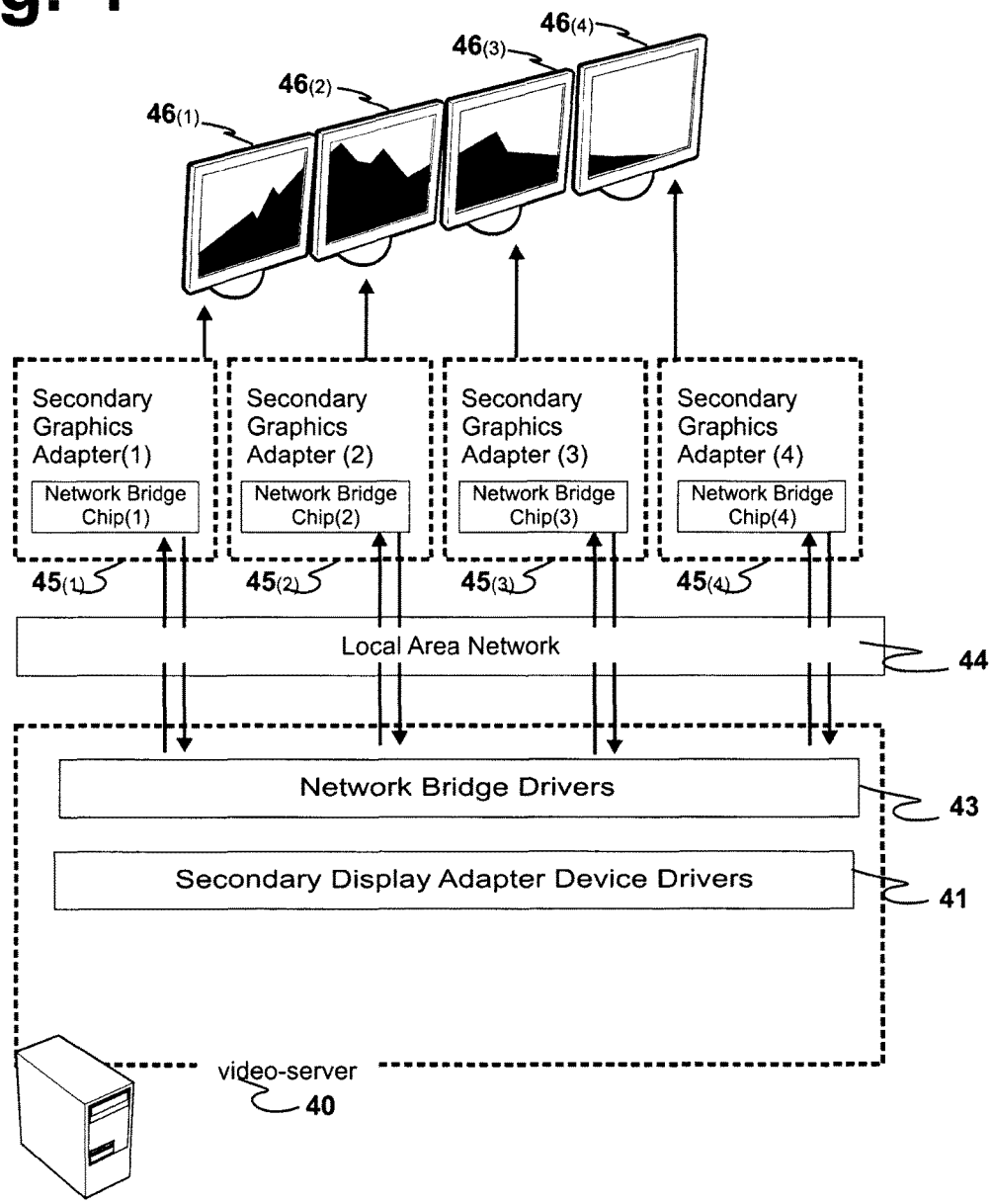

SYSTEM AND METHOD OF PROCESSING IMAGES INTO SUB-IMAGE PORTIONS FOR OUTPUT TO A PLURALITY OF DISPLAYS SUCH AS A NETWORK VIDEO WALL

CROSS-REFERENCE TO RELATED APPLICATION

This application claims priority from U.S. Provisional Patent Application No. 61/926,295 filed on Jan. 12, 2014, which is hereby incorporated by reference.

FIELD OF INVENTION

Large electronic displays, may be formed from an array of monitors referred to as a "video-wall". For example video-wall might be comprised of a 3 by 3 array of nine monitors, each monitor simultaneously displaying a segment of a single image, thereby creating the appearance of a single large display comprised of rectangular portions.

It is generally desirable to have full flexibility in the variety of transformations that can be performed so as to enable complete artistic flexibility in arrangement of the displays comprising the video wall and it is also generally desirable to have flexibility in the ultimate output to displays via the use of secondary graphics adapters enabling the displays to either be attached to the same host system or remotely connected over the network.

BACKGROUND OF THE INVENTION

The present invention relates generally to improving the setup and operation of video-wall displays and particularly to network addressable displays.

A video-wall display system is a method to overcome the costs of manufacturing and installing very large displays, by assembling a large display using multiple smaller displays arranged and working together. By dividing a single image into several sub-images and displaying the sub-images on an appropriately arranged array of display devices a larger display with higher resolution can be created.

Traditional video-wall methods involve pre-processing and time-syncing separate video files (a method unable to deal with real-time content); distributing the entire video file to all devices and having them individually render the whole file and crop to the relevant portion for their display (a method unable to deal with high-resolution content unless each display is equipped with a powerful server and network), and/or using traditional video cards connected to the server (which requires the server to be physically close to the video-wall or requires expensive proprietary and complex video extension systems). All of these conventional approaches have significant limitations therefore a new approach is desirable.

In a traditionally video-wall graphical application content is rendered to a Graphics Processing Unit (GPU) where it is then directly output by the GPU to the attached display(s). Hence this traditional approach to video-walls requires the server to house one physical video output (and attached display) for each segment of the video wall. The requirement for a physical video output limits both the size (number of potential attached screens) and the distance to the displays that can be achieved with a single video wall server.

Network Video-Wall:

As a method of reducing costs, increasing flexibility and performance and adding redundancy, there is a general need to be able to display real-time content on a video-wall employing low-cost/low-power endpoint devices that are in communication with a powerful central server that sends them video content via a traditional network. This approach allows source content to be changed dynamically (for example from live video feeds) with minimal (e.g., undetectable to the human eye) time delay, and without intensive pre-rendering of the source file itself. If the power needs of the endpoints are low, they can be met by power over Ethernet, and such endpoints do not need to have an independent power delivery. Additionally this network-to-server based approach ensures that displays can be automatically switched to a back-up failover server and resume playing content in the event that the original server fails. This approach also allows a single server to simultaneously drive the playback of multiple video-walls in different locations (each video-wall could either playing different content or show the same image in several rooms with negligible additional CPU usage). Further by using this method, a single video-wall server can be configured to replicate the source content across multiple video-walls (synchronized outputting of an input source—to multiple output video-walls) with reduced cost of acquiring, splitting and rendering the content; The general video-wall invention can be modified to allow both input source and output displays to be changed on the fly (enabling individual displays to be dynamically added into or removed from the video-wall without interrupting playback on other displays).

DESCRIPTION OF THE INVENTION

This networked video wall invention efficiently splits the large source-video on-the-fly and distributes the resulting compressed video frames over the network to multiple listening display devices. Built-in algorithms optimize, parse and scale the individual video-wall segments on the fly. Each display can be independently positioned and oriented/rotated within the video-wall.

In a network video wall (where graphic content is delivered over the network for output to display devices), due to the bandwidth constraints, each individual segment of the frame must first be captured and separately compressed and sent out over the network for processing and rendering by the network endpoint.

The present disclosure discusses improvements video output processing pipeline which aids a new playback mechanism to provide a multi-display video wall using secondary video cards (which can be locally or remotely connected) but can source content rendered to the GPU from any host process (i.e. the operating system, the window manager, a specific application, etc.).

The information on the position, configuration and settings for each of individual physical display and how they relate to the video-wall canvas is stored in a computer readable medium. Using this information the server decodes, renders and splits/crops an image into multiple sub-sections each sub-section corresponding to a physical display for playback on said physical display. The server then re-encodes each of these display segments into a compressed video frame (using a video encoding methods such as mjpeg) and sends each of these video frames over a standard TCP/IP network to the individual network-connected display device corresponding to the said display segment and comprising the video-wall. The display device in communication with the server, on receiving of said compressed video frame, decompresses and decodes the image and outputs it to the physical display using the settings supplied by the server. Together these multiple display devices recreate the image submitted to the server for simultaneous playback on multiple displays. The server processes the image in real-time and the individual cropped and compressed video frames are all delivered by the server to the display device over the network in real-time, bandwidth and image fidelity having been conserved by sending only the compressed video data applicable to a single display.

Because these requirements (imposed by network delivery) are CPU intensive one would typically have the CPU both render the graphical content and split it into separate frames for network delivery. However using this approach it is not possible to take advantage of the advanced video decoding, processing capabilities and application optimizations offered by having applications output directly to the GPU. Additionally with a network video wall using the CPU only, the number of displays that can be connected is limited and GPU underutilized.

Typically the GPU frame-buffer from which the CPU must read from is private and is typically passed directly to video signal processors for output to a display and consequently is optimized for writing rather than reading and read performance is typically slow. Consequently given the multitude of displays in a video wall (each requiring cropping of its corresponding sub-image portion), requiring the CPU to read directly from the GPU frame-buffer for each of these (e.g., 25 times for a 5x5 video wall) would be infeasible.

The present disclosure provides a method to utilize both the CPU and GPU to work together to address the technical and performance challenges of a network video wall by increasing performance and reducing server cost).

The GPU graphics card (i.e., video card) provides a single large rendering frame-buffer (the GPU frame buffer) to the operating system, window manager, video player or application as if a single large resolution display were connected. Thus the operating system, desktop and all running applications are able take advantage of the hardware acceleration, video decoding capabilities, and any other optimizations offered by the GPU thus maintaining full performance of the graphics pipeline. Their final rendered content is housed in the GPU frame-buffer (or render buffer) hosted by the video card. Using the GPU enables full flexibility and performance for the system to deliver any content input to or generated by the GPU to be efficiently processed for output to the multiple displays. However, because GPU frame-buffers are located within their own memory location (typically in a context private to the video card) these GPU frame-buffers are typically not efficiently accessible to the CPU for the repeated intensive sub-processing required in applications such as a video wall where the original frame buffer must be accessed, processed and split into multiple frames.

The efficiency can be improved as follows: Graphical application content provided to the GPU, is rendered by the GPU through the standard graphics pipeline, and then stored within the GPU's frame buffer. A working-copy of this frame buffer is then made in system memory, facilitating faster performance for subsequent processing operations. It is this working-copy frame-buffer that is then processed (and divided into a plurality of sub-images) for output to the plurality of displays.

Direct Memory Map:

Splitting a frame-buffer into multiple sub-images (particularly when there are advanced transformations such as rotation required) can be CPU intensive. While these transformation operations can be optimized it still requires the transformations to be calculated and applied to each frame as each frame is processed to extract the sub-image portions. In one embodiment of the invention, a direct memory map is utilized to accelerate the transformations of the working-copy frame buffer image into multiple sub-images for output to the multiple displays comprising the video wall. Using the memory map the transformation calculations need to be done just once, the outcomes of which are stored in the memory map. This memory map is applied to read the correct corresponding pixels from the working frame-buffer appropriate to the transformations required (accounting for resizing, rotation, cropping, and color space conversion as appropriate). Thus the regions to be output (sub-images) can be separated (to correct for display bezels), rotated, overlapping or any imaginable arrangement coupled for output to individual ones of the plurality of displays comprising the video wall more rapidly via the memory map.

Simultaneous Rendering of a Single Source on Multiple Identically Configured Video-Walls.

It is often desirable to have multiple identically configured video-walls in various parts of the building displaying the same video content. However, processing video-wall content and preparing it for output to individual displays is CPU intensive. In one embodiment of the invention, server CPU usage can be minimized by replicating exactly the same content across multiple identically configured video-walls. In one embodiment the video-wall server achieves this by processing the content and sending out the network video frames via network broadcast. In this way the video rendering and splitting is performed just once on the source-video file in spite of having for example ten video-walls on the network each listening to and rendering this same network broadcast video stream and displaying it on the video-wall.

Coordinating Fail-Over of Network Video-Wall Between Multiple Servers.

Since video-walls are typically very prominently and publicly located any service interruption is highly visible. In one embodiment, in the event that the server powering a video-wall fails, the network-connected displays comprising the video-wall automatically resume playing, powered by an alternate server. In this embodiment, matrix coordinates for each display within the array along with other video-wall settings (e.g., bezel spacing) are in a configuration file stored in advance on the backup server(s). This configuration file may include information such as the uniquely identifying information for each network display device (e.g., MAC address and/or serial number), the display settings (e.g. resolution), its position within the video-wall array (e.g., 1:3), its rotation, its exact placement within the video-wall canvas (e.g., coordinates of the top left corner of the display within the video-wall canvas) etc. In one embodiment of the invention, during a fail-over situation (when a network display device loses its connection to its server) it automatically tries to re-establish connection to the server. The pre-determined fail-over/backup server pretends to be the original server (in one embodiment this is achieved by emulating the failed server's server name). Consequently the network display devices do not need to be programmed with the IP address of multiple servers, they simply always ask for the same server, and the servers are smart enough to switch back and forth as to which devices they accept. Playback can either be scheduled to begin once the first of the displays reaches the backup server or can be delayed until all the network displays within the video-wall have connected to the backup server.

Simultaneous Rendering of a Single Source on Various Network Displays Including Video-Walls by a Single Server.

Decoding of the source video file is performed once, but splitting, scaling and encoding for delivery to the various network displays are performed as required for each individual target independent display device or video-wall segment. Basically the video wall server processes the source file then sends it simultaneously to multiple different sized secondary output displays (pre-optimizing the content).

Alternating Between Unified and Independent Operation: 'Flash-Mob' Video-Wall.

In one embodiment of the invention, independent displays can be temporarily brought together to create a video-wall called a 'Flash Mob' video-wall. This flash mob display gains enhanced audience attention by temporarily switching a collection of multiple displays from playing independent content to synchronized playback of synchronized content. The results are similar to a flash mob: where people originally moving independently in a public space suddenly switch to moving in perfect synchronization to communicate a message, then return to going about their independent business. Any place with large numbers of digital displays (e.g., such as a food court, airport terminal, casino, TV show-room, etc.) could implement a "flash-mob display" as a way to sell high value advertising. The displays have independent TCP/IP connection to a single server of the type envisaged in this invention which has been programmed to be aware of their relative positions and adjacent edges. The single server controls multiple displays showing independent content. During periods where they are behaving as a flash-mob they are temporarily driven as a single video-wall displaying an animated or synchronized message, creating a spontaneous video-wall or work of art out of otherwise normally independent displays achieving a very powerful and memorable short-term visual impact.

In situations (such as quick-service restaurant order desks, TV sales displays, and airport checking counters) where the displays comprising the flash-mob video-wall are arranged edge to edge within a single field of vision the displays could produce an image similar to those on a traditional video-wall (except a long horizontal image). In other situations the effect may be tightly coordinated choreography or synchronized use of the independent displays to create a visual effect. Among the particular realizations of this embodiment are the following. In a TV Showcase, the video-wall can enable a variety of displays in a retail environment to either temporarily or permanently become a continuous video-wall. In a Food court scenario, neighboring displays cooperate in momentarily switching the displays to display advertisements.

The invention provides for additional embodiments as follows:

In one embodiment a video capture card (such as an HDMI capture card) is installed in the server as a way for the server to receive input video source content.

In one embodiment a soft input source such as:
an HTML5 URL;
a remote desktop protocol;
a network video stream;
a digital signage stream;
or a locally running application program;
is used as the source of content for the video-wall.

In one embodiment a dummy session is utilized (e.g., a browser session running at the target resolution for the combined video-wall canvas [e.g., 3840×2160] is rendering the target content to the GPU (using for example a GPU accelerated browser session to render the html5) and then video wall splitter then reads graphical data from the GPU buffer and splits the output from this dummy terminal into the individual cropped and compressed segments for output to the video-wall.

In one embodiment the video-wall server communicates directly with the display over a wifi network (rather than for example using the wireless network router), using for-example miracast or chromecast display protocols.

In one embodiment the displays comprising the video-wall are receiving their display signal from zero-client devices that are receiving the compressed image in communication with the video-wall server.

In one embodiment the individual network connected displays comprising the video-wall are receiving their display signal from System-On-a-Chip (SOC) devices running an operating system (e.g., the android operating system) and an application (e.g. a video playing application). These SOC devices are in turn receiving the compressed image in communication with the video-wall server.

In one embodiment of the invention, the network-connected displays are Power-over-Ethernet (PoE) with a single cable providing both the data (Ethernet video-wall data) and power delivery to the display, eliminating the need for a power-outlet at the location of the displays.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments can also be embodied as computer readable code on a computer readable medium. The computer readable medium is any data storage device that can store data, which can be thereafter read by a computer system. Examples of the computer readable medium include hard drives, solid state drives (SSD), network attached storage (NAS), read-only memory, random-access memory, Optical discs (CD/DVD/Blu-ray/HD-DVD), magnetic tapes, and other optical and non-optical data storage devices. The computer readable medium can also be distributed over a network coupled computer system so that the computer readable code is stored and executed in a distributed fashion.

Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

While the system and method has been described in conjunction with several specific embodiments, it is evident to those skilled in the art that many further alternatives, modifications and variations will be apparent in light of the foregoing description. Thus, the embodiments described herein are intended to embrace all such alternatives, modifications, applications and Variations as may fall within the spirit and scope of the appended claims.

BRIEF DESCRIPTION OF THE DRAWINGS

Embodiments will now be described more fully with reference to the accompanying drawings in which:

FIG. 4 is a block diagram illustrating the output to the secondary display controllers in a specific realization.

DETAILED DESCRIPTION OF THE DRAWINGS

Figure 1:
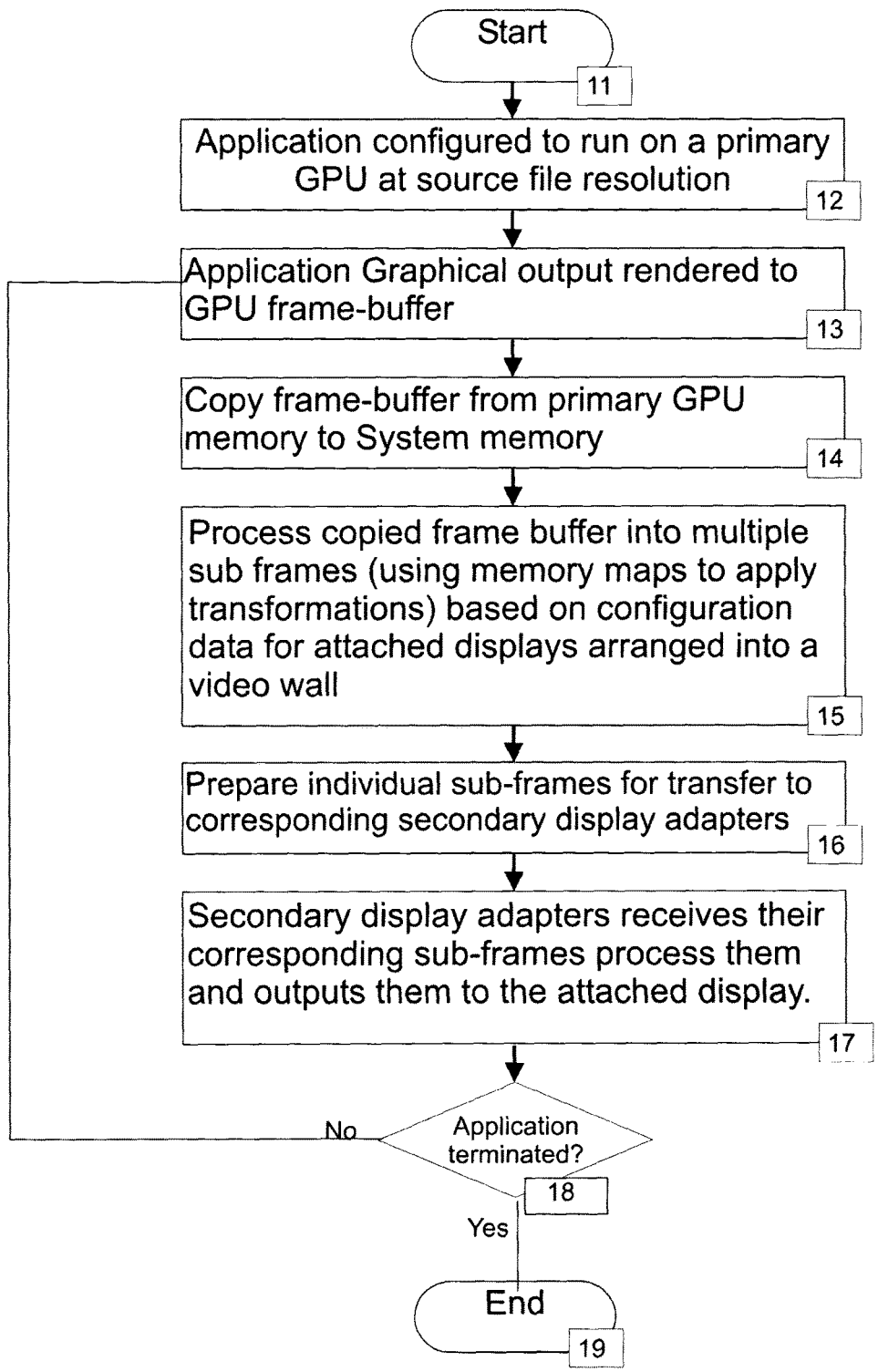
FIG. 1 is a flow diagram of the rendering of the image in one embodiment of the invention.

FIG. 1 is a flow diagram showing the process of whereby image data is processed and prepared for output to a plurality of displays in one embodiment of the invention. At the start of the process the application is configured to render its content via the primary GPU (12), at the designated resolution (this could be either the resolution of the final output video wall canvas or the maximum resolution that can be handled by the GPU, or some other canvas resolution). At (13) this content has been rendered directly to the GPU frame buffer by the GPU. Due to the aforementioned limitations of graphics memory this frame buffer is then copied onto the system memory as the "working-copy frame buffer" (14). Reading from the image data now stored in the working copy frame buffer the frame buffer is then transformed, (in the preferred embodiment via the use of memory maps), in to sub-image (or sub-frame) portions based on the configuration data for the plurality of displays comprising the video wall, (15). This could involve any number of different transformations depending on the rotation, color-space conversion, cropping, scaling, color-correction or edge blending required. These sub-frames are prepared for transfer to the secondary graphics adapters (16) which depending on the target secondary graphics adapters could again involve encoding and transfer over a network in the case of a network connection to the secondary adapters or just involve sending to a graphics driver in the case of discrete secondary graphics adapters. The secondary adapters on receipt of these sub-frames processes them and output them to the corresponding display (17) Steps 13 through 17 are then repeated until the application is terminated (18) at which point the process begins again with a different application.

Figure 2:
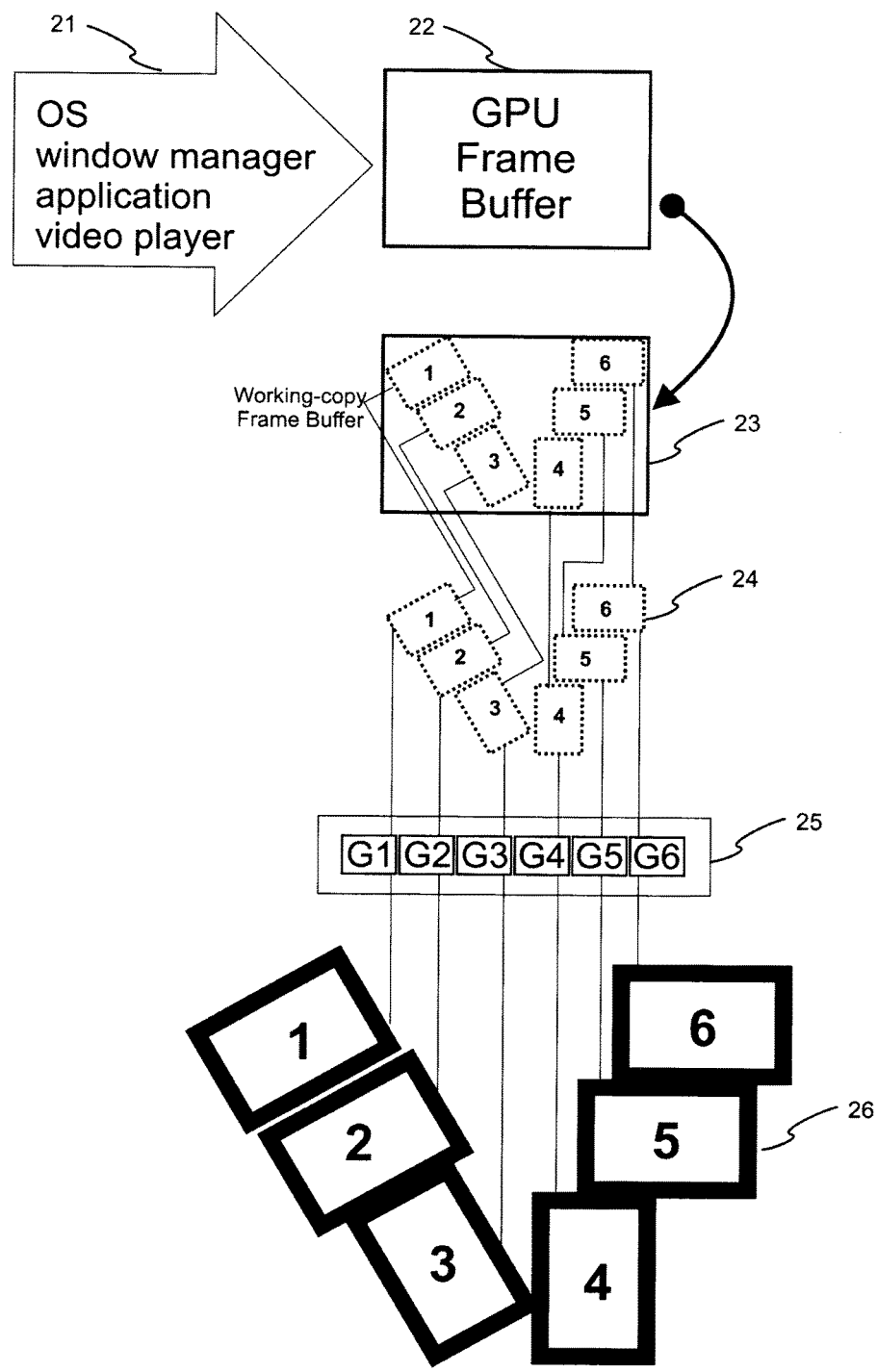
FIG. 2 is a block diagram of the rendering and delivery to the video wall displays.

FIG. 2 is a block diagram of the rendering and delivery to a non-standard "artistic'" arrangement of the video wall displays. At (21) a particular source content (either the operating system, the window manager an application, a video player or another image source, such as for example HDMI capture) passes content to the GPU for conversion and storage in the GPU frame buffer, (22). This frame buffer is copied across from graphics memory to system memory to the "working copy frame buffer". Subsequently the designated sub-images, based on the mapping configuration between displays and the image canvas required for ultimate display on the video wall, are then read/trapped/processed from the working frame buffer, shown in stage (23). Each individual sub-image portion is then processed from the working frame buffer, each sub-frame appropriate to (and for ultimate output to) the particular display of the video wall being addressed (24). Each sub-image portion is delivered to the corresponding secondary display adapter show as, G1 to G6 at (25), each display adapter in turn outputting the provided (processed) image data to the corresponding display units at (26).

Figure 3:
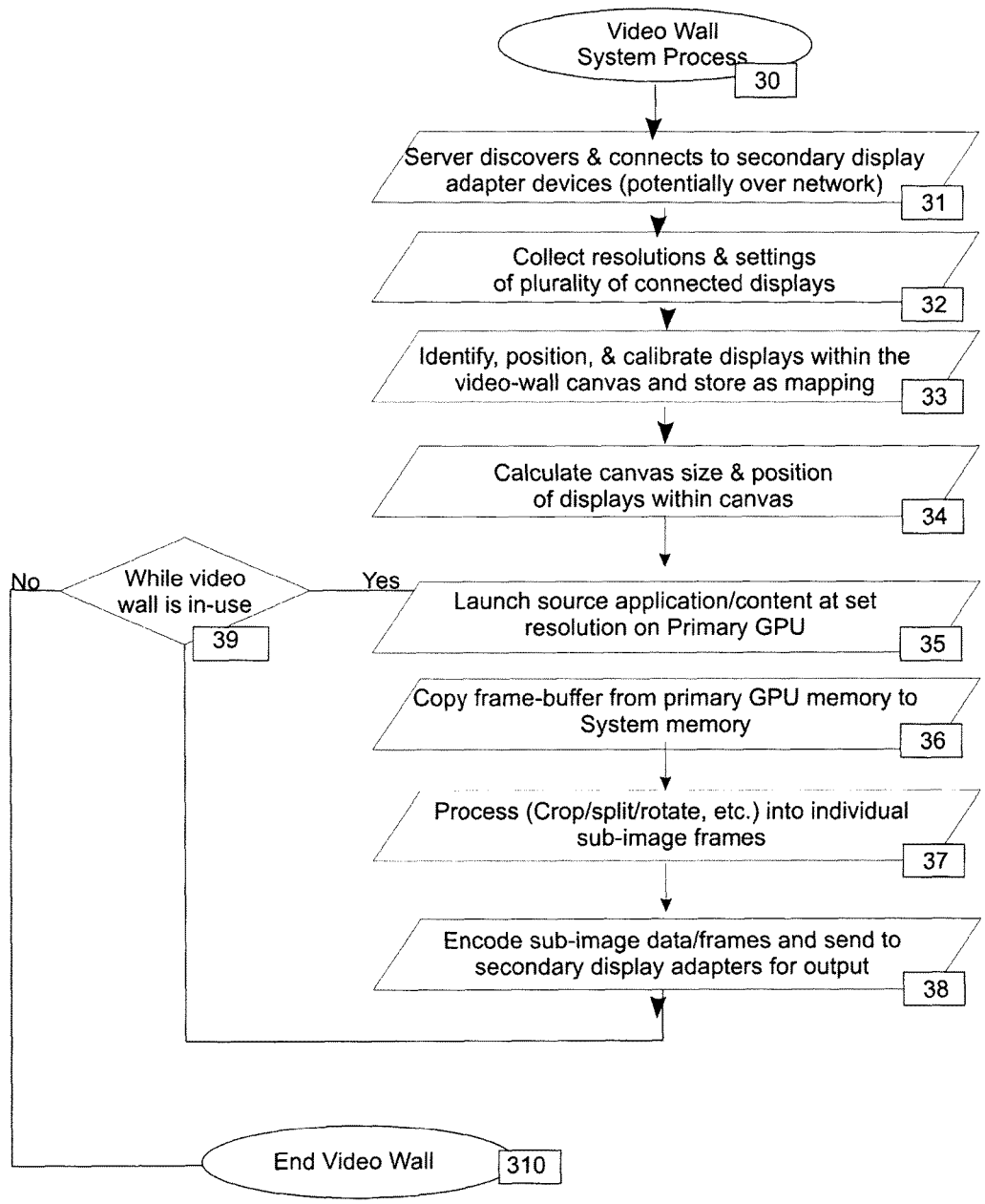
FIG. 3 is a flow diagram of one specific embodiment of a network video wall.

FIG. 3 is an illustration of one specific embodiment of the whole video-wall system process in which the embodiment pertains to a network video wall (30). The server first discovers and connects to the zero-client devices over the network (31). Next it collects the available display resolutions and other available settings from all the connected displays (32). Then the mappings and settings of the displays are configured, as specified by a method of setting up a video wall including identifying, positioning and calibrating for each of the displays. This configuration mapping data is then stored in a retrievable data store such as a configuration file (33). The next step is to calculate the canvas size as well as the positions of the displays with in the canvas (34). The preliminary steps in the setup of the video wall system are now complete and the system is ready to process and deliver content to the video wall displays. It can now receive content for display via the primary GPU processing application output frame by frame to the GPU frame buffer (35), and copying from the GPU frame buffer to the working frame buffer in system memory (36). From there the cropping, splitting, rotating, and other processing of image content required for output is done to create the individual sub-image portions derived from the original image data (37) to be encoded and sent (either over the network to a network graphics adapter or via USB to a USB graphics adapter or via a direct connection in the case of a discrete graphics adapter, etc.) to the appropriate devices for output to the appropriate secondary display adapters which in turn outputs the transformed image data to the corresponding displays (38), together creating displaying the video wall image across all displays. This decoding and displaying process is continued while the video-wall is in use (39), and ends when terminated (310).

FIG. 4 illustrates one embodiment of how network display devices can be used as the secondary display adapters. Given the broad range of display adapters that can be communicated with over a network (including through an intervening computing device), just one is illustrated and detailed here for illustration of the basic concept.

The host video-wall server (40) processes the graphics (per previous illustrations) to the point where the individual sub-images are ready for output to the secondary display devices. In this illustration of one particular embodiment, the secondary display controllers are USB graphics adapters ($45_{(1)}$ to $45_{(4)}$) housed within a network device connected over a local area network (44) to the video-server via network bridge chip ($46_{(1)}$ to $46_{(4)}$) and network bridge drivers (43). Hence in this particular embodiment image data output to the secondary display controller device drivers is encoded by that driver, then transparently transferred over the network (44) via the network bridge drivers and network bridge chip which makes the secondary display controller appear as a locally connected display controller the video wall server.

What is claimed is:

1. A system for processing video graphics for synchronized output to a plurality of displays, the system comprising:
   a plurality of displays, each display coupled to a secondary graphics adapter;
   at least one video-server comprising:
   a computer readable memory;
   at least one Graphics Processing Unit (GPU) and;
   at least one processor;
   wherein the at least one video-server is configured to perform:
      rendering, by at least one application, video data frames containing video-image pixel data at a designated resolution to a source frame buffer residing in the computer readable memory;
      accessing a stored mapping of a placement of the plurality of displays and deriving a corresponding plurality of sub-image portions of the source frame buffer according to the stored mapping of the placement of the plurality of displays;
      calculating at least one memory map enabling video-image pixel data to be read from at least one of the corresponding plurality of sub-image portions of the source frame buffer, the at least one memory map being re-calculated in response to changes in the designated resolution or in the stored mapping of the placement of the plurality of displays;
      copying pixel data from individual video data frames from the source frame buffer to at least one sub-image frame buffer, by means of the at least one memory map; and
      processing the at least one sub-image frame buffer for output to at least one of the plurality of displays via the corresponding coupled secondary graphics adapter being in communication with the at least one video-server.

2. The system of claim 1, wherein the corresponding coupled secondary graphics adapter comprises at least one of:
   USB graphics adapter;
   Network-connected USB graphics adapter;
   USB connected zero-client device;
   Network-connected zero-client device;
   wireless display;
   embedded graphics adapter within a network-connected system-on-a-chip device;
   embedded graphics adapters within network connected ARM chip;
   graphics adapter within a network connected PC;
   video card;
   discrete graphics adapter;
   multi-head video card;
   displayport display;
   USB display; or
   Graphics Processing Unit (GPU).

3. The system of claim 1, wherein the corresponding coupled secondary graphics adapter is in communication with the at least one video-server via a communication network and the processing of the sub-image frame buffer for output comprises encoding for sending over the communication network.

4. The system of claim 3, wherein the communication network comprises at least one of:
   a wireless network;
   an Ethernet network;
   a TCP/IP network;
   miracast;
   wireless display (widi);
   chromecast;
   matchstick;
   rtsp;
   tcp/ip;
   wifi;
   802.11.

5. The system of claim 3, wherein the network-connected secondary graphics adapter is embedded in a Power-over-Ethernet (PoE) display and a single Ethernet cable provides both power for the display to which the network-connected secondary graphics adapter is coupled and data from the at least one video-server.

6. The system of claim 1, wherein the corresponding coupled secondary graphics adapter is in communication with the at least one video-server, the corresponding coupled secondary graphics adapter supplying information obtained from the display to which it coupled to the at least one video-server, and the at least one video-server supplying display settings to the corresponding coupled secondary graphics adapter.

7. The system of claim 1, wherein the at least one video-server further comprises a plurality of primary GPUs being used in combination to increase the designated resolution of the video-image pixel data.

8. The system of claim 1 further comprising a plurality of video-servers working in tandem, each video-server, configured by its stored mapping of display placements, processes and outputs its own sub-image portion to an independent subset of displays, and the combination of the independent subsets of displays processed and output by the plurality of video-servers forming a video wall.

9. The system of claim 1, wherein the at least one application is a video player, and the at least one GPU is configured to use hardware accelerated video decoding, and the source frame buffer is the at least one CPU's decoder buffer.

10. The system of claim 1, wherein the at least one GPU is an integrated GPU and the computer readable memory comprising the source frame buffer is shared graphics memory.

11. The system of claim 1, wherein the at least one GPU is an integrated graphics adapter and the corresponding coupled secondary graphics adapter is a discrete graphics adapter attached to the at least one video-server.

12. The system of claim 1, further comprising a plurality of identical video walls, wherein the sub-image frame buffer is synchronously output to corresponding displays of the plurality of identical video walls via corresponding displays' coupled secondary graphics adapters.

13. The system of claim 1, wherein the processing the at least one sub-image frame buffer for output to the at least one of the plurality of displays comprises at least one of:
   bezel correction for output to a monitor;
   overlap for edge-blending for output to a projector;
   color-space conversion to facilitate output to a target secondary graphics adapter;
   resizing to correspond to a target resolution of the corresponding coupled secondary graphics adapter;
   encoding for efficient network transmission;
   rotation of sub-images to account for rotated displays;
   color-correction to compensate for differences between displays;
   resizing or scaling of a content appropriate to a target output display size;

synchronization of transmission of frames to the corresponding coupled secondary graphics adapter to optimize output synchronization.

14. The system of claim 1, wherein the plurality of displays comprise at least one of the following devices:
   monitor;
   touch screen display;
   front projected display;
   rear-projected display;
   illuminated digital display;
   reflective digital display.

15. The system of claim 1, where the calculating of the at least one memory map includes pixel transformations to achieve at least one of:
   rotation;
   cropping;
   bezel correction;
   edge-blending of overlap for output to a projector;
   resizing to correspond to a target resolution;
   color-space conversion to facilitate output;
   resizing;
   linear resizing;
   scaling;
   distorted scaling;
   color-space conversion;
   colour-adjustment;
   rotation to account for rotated displays; or
   color-correction to compensate for differences between displays.

16. A non-transitory, tangible, computer readable medium having thereupon instructions that, when executed by at least one processor for at least one video-server for synchronized output to a plurality of displays, the at least one processor is configured to perform:
   rendering, by at least one application, video data frames containing video-image pixel data at a designated resolution to a source frame buffer residing in a computer readable memory;
   accessing a stored mapping of a placement of the plurality of displays and deriving a corresponding plurality of sub-image portions of the source frame buffer according to the stored mapping of the placement of the plurality of displays;
   calculating at least one memory map enabling video-image pixel data to be read from at least one of the corresponding plurality of sub-image portions of the source frame buffer, the at least one memory map being re-calculated in response to changes in the designated resolution or in the stored mapping of the placement of the plurality of displays;
   copying pixel data from individual video data frames from the source frame buffer to at least one sub-image frame buffer, by means of the at least one memory map; and
   processing the at least one sub-image frame buffer for output to at least one of the plurality of displays via the corresponding coupled secondary graphics adapter being in communication with the at least one video-server.

17. The non-transitory, tangible, computer readable medium claim 16, wherein the corresponding coupled secondary graphics adapter comprises at least one of:
   Network-connected USB graphics adapter;
   USB connected zero-client device;
   Network connected zero-client device;
   wireless display (widi);
   embedded graphics adapter within a network-connected system-on-a-chip device;
   embedded graphics adapters within network connected ARM chip;
   graphics adapter within a network connected PC;
   video card;
   discrete graphics adapter;
   multi-head video card;
   displayport display;
   USB display; or
   Graphics Processing Unit (GPU).

18. A method for video processing for synchronized output to a plurality of displays, each display coupled to a second graphics adapter, the method comprising the steps of:
   rendering, by at least one application, video data frames containing video-image pixel data at a designated resolution to a source frame buffer residing in a computer readable memory;
   accessing a stored mapping of a placement of the plurality of displays and deriving a corresponding plurality of sub-image portions of the source frame buffer according to the stored mapping of the placement of the plurality of displays;
   calculating at least one memory map enabling video-image pixel data to be read from at least one of the corresponding plurality of sub-image portions of the source frame buffer, the at least one memory map being re-calculated in response to changes in the designated resolution or in the stored mapping of the placement of the plurality of displays;
   copying pixel data from individual video data frames from the source frame buffer to at least one sub-image frame buffer, by means of the at least one memory map; and
   processing the at least one sub-image frame buffer for output to at least one of the plurality of displays via the corresponding coupled secondary graphics adapter being in communication with at least one video-server.

19. The method of claim 18 wherein, the corresponding coupled secondary graphics adapter of the plurality of displays comprises at least one of:
   USB graphics adapter;
   Network-connected USB graphics adapter;
   USB connected zero-client device;
   Network-connected zero-client device;
   wireless display (widi);
   embedded graphics adapter within a network-connected system-on-a-chip device;
   embedded graphics adapters within network connected ARM chip;
   graphics adapter within a network connected PC;
   video card;
   discrete graphics adapter;
   multi-head video card;
   displayport display;
   USB display; or
   Graphics Processing Unit (GPU).

20. The method of claim 18, wherein the corresponding coupled secondary graphics adapter is in communication with the at least one video-server via a communication network and the processing of the sub-image frame buffer for output comprises encoding for sending over the communication network.

* * * * *